United States Patent
Odem

(10) Patent No.: US 8,371,060 B2
(45) Date of Patent: Feb. 12, 2013

(54) CONCEALED HOOK FISH LURE

(76) Inventor: Jimmy D. Odem, Saucier, MS (US)

( * ) Notice: Subject to any disclaimer, the term of this patent is extended or adjusted under 35 U.S.C. 154(b) by 294 days.

(21) Appl. No.: 12/832,256

(22) Filed: Jul. 8, 2010

(65) Prior Publication Data

US 2012/0005943 A1 Jan. 12, 2012

(51) Int. Cl.
*A01K 85/02* (2006.01)
*A01K 83/02* (2006.01)

(52) U.S. Cl. ..................... 43/35; 43/34; 43/36

(58) Field of Classification Search .............. 43/34–37
See application file for complete search history.

(56) References Cited

U.S. PATENT DOCUMENTS

| | | | | |
|---|---|---|---|---|
| 627,344 | A * | 6/1899 | Maroney | 43/35 |
| 1,391,030 | A * | 9/1921 | Wheeler | 43/35 |
| 1,701,643 | A * | 2/1929 | Stoll | 43/35 |
| 1,890,266 | A | 12/1932 | Shadel | |
| 2,044,702 | A * | 6/1936 | Kalyu | 43/35 |
| 2,079,509 | A * | 5/1937 | Kettring | 43/35 |
| 2,200,670 | A * | 5/1940 | Hargrett | 43/35 |
| 2,205,773 | A | 6/1940 | Fox | |
| 2,311,832 | A * | 2/1943 | Helfenstein | 43/36 |
| 2,325,247 | A | 7/1943 | Heflin | |
| 2,381,279 | A * | 8/1945 | Haberkorn | 43/36 |
| 2,396,366 | A * | 3/1946 | Forbess | 43/36 |
| 2,442,866 | A * | 6/1948 | Stein | 43/36 |
| 2,445,461 | A * | 7/1948 | St. John | 43/35 |
| 2,563,880 | A * | 8/1951 | Spaid | 43/37 |
| 2,806,318 | A * | 9/1957 | Roberts | 43/35 |
| 3,081,572 | A * | 3/1963 | Tomsello | 43/35 |
| 3,117,389 | A * | 1/1964 | King | 43/35 |
| 3,175,322 | A * | 3/1965 | Snyder | 43/36 |
| 3,418,743 | A * | 12/1968 | Halvorsen | 43/35 |
| 3,646,699 | A | 3/1972 | Zeman | |
| 3,665,634 | A | 5/1972 | Baud | |
| 4,020,583 | A | 5/1977 | Gatlyn | |
| 4,176,489 | A | 12/1979 | Levstik | |
| 4,446,647 | A * | 5/1984 | Kahl | 43/36 |
| 4,528,770 | A * | 7/1985 | McDiarmid | 43/35 |
| 4,562,661 | A | 1/1986 | Messinger et al. | |
| 4,782,618 | A | 11/1988 | Rainey | |
| 5,097,619 | A | 3/1992 | Bologna | |
| 6,266,916 | B1 | 7/2001 | Dugan | |

(Continued)

FOREIGN PATENT DOCUMENTS

JP 09191796 A * 7/1997
JP 10248442 A * 9/1998

(Continued)

*Primary Examiner* — Darren W Ark
(74) *Attorney, Agent, or Firm* — Steve C. Thornton

(57) ABSTRACT

A concealed hook fish lure is disclosed. In one embodiment, a lure body contains an interior body cavity wherein is placed a hook that is pivotally mounted on a bar with a spring biased to rotate the hook. In the non-deployed position, the hook is concealed and retracted within the lure up to the moment of the strike. At the moment of the strike, the fish compresses a hook trigger clip which releases the hook, which is then pivoted upwardly into the mouth of the fish, thereby facilitating the setting of the hook in the fish's mouth. The lure is useful in waters containing weeds and other debris, and provides improvements with respect to a simple mechanism for deploying the hook, and the ability to deploy hooks in multiple directions relative to the lure body. The hook may also be readily retracted to and cocked in its concealed position following a strike.

5 Claims, 4 Drawing Sheets

U.S. PATENT DOCUMENTS

| | | | |
|---|---|---|---|
| 6,931,783 B1 * | 8/2005 | Faulkner | 43/35 |
| 6,941,695 B2 * | 9/2005 | Minegar | 43/35 |
| 7,908,787 B2 * | 3/2011 | Finley | 43/36 |
| 2007/0101634 A1 * | 5/2007 | Clapp | 43/35 |

FOREIGN PATENT DOCUMENTS

| | | |
|---|---|---|
| JP | 11137124 A * | 5/1999 |
| WO | WO 2004021775 A1 * | 3/2004 |

\* cited by examiner

CONCEALED HOOK FISH LURE

TECHNICAL FIELD OF THE INVENTION

This invention relates, in general, to mechanisms that utilize hooks to catch fish, such as fishing lures, and, in particular, to a lure having at least one hook concealed inside a body, thereby rendering the lure substantially weedless and non-snagging, which hook is held in the concealed position by means of a retaining clip that is biased to hold the hook in the concealed position until depressed by the pressure of a fish striking the lure, and which hook is deployable by means of a coil spring biased to deploy the hook.

BACKGROUND OF THE INVENTION

Artificial fishing lures used by anglers vary widely in their operation as well as their appearance. There have been many attempts in the past to provide a fish lure of the artificial bait or plug type having improved ability to catch fish when trolled or retrieved at the end of a line. The majority of such lures resemble or simulate prey, such as a small fish or insect which serves as a food source for carnivorous fish intended to be caught; and most such lures are provided with external pointed, barbed end hooks, in single, treble or gang configurations for engaging the fish when it strikes or swallows the lure, even partially. Such hooks embed in the throat or mouth of the fish when hit upon.

Exterior hooks present numerous problems. Some of the most common problems encountered with conventional fishing lures are weeds and obstructions snagging or collecting on exposed hooks, the visibility of the hooks, and failure of the hook to set firmly in the fish's mouth. There is the possibility that discerning fish avoid lures having hooks dangling therefrom. Exterior hooks can also interfere with the open-mouthed envelopment of the lure or at least the major portion thereof by the fish. When caught on under-water debris, exterior hooks may cause damage to the fishing rod or break the line. Exposed hooks also become entangled in fish line and with other equipment when the tackle container is being moved about.

In order to solve exterior hook problems, there have been numerous attempts to provide lures with hooks which are retracted within the body of the lure during normal trolling or retrieving action and then extended for engagement with the fish due to some action upon the lure by either the fish or by the fisherman upon sensing a fish strike. Many of these devices utilize spring mechanisms which keep the hook in a retracted position until the fish bites, whereupon the hook becomes exposed. Some of these devices require control or action by the fisherman to activate the hook's movement from its retracted position. The most common design of retracted hook lures incorporates the use of a moveable trigger to disengage one or more spring-biased hooks as the body of the lure makes contact with some restraining force and the trigger causes a disengagement of the spring-biased hooks.

Lures known in the prior art in which the hooks are concealed within the body of the lure and are designed to be exposed in response to a fish strike exhibit certain deficiencies relating to design function and complexity. One flaw that has yet to be remedied appears to be the inability to maintain the hooks in a retracted position during the initial cast. One example of the prior art devices of this kind is the type which require a multiplicity of events to occur for actuation—a fish strike and a pull on the fish line to effect ejection of the hook. For those fishing lures which have hooks hidden inside the lure body, and which are released by the angler pulling sharply on the fishing line, it is difficult for the fisherman to accurately time when the line must be pulled, or to know the difference between whether a fish has struck his bait or the lure has simply collided with a rock or other impediment. Others examples of prior art devices utilize complex linkage structures through which the hooks are triggered. Other known lures with concealed hooks allow such hooks a very limited exposure or range of travel when deployed into the exposed position. This limited exposure may permit some fish to spit or expel the lure after it has initially struck.

In general, problems encountered with the prior art devices include: (a) mechanisms difficult to assemble and keep operative; (b) unfavorable orientation of hooks or barbs for hooking and retrieving fish; and (c) complex mechanisms for deploying the hook, and (d) mechanisms that involve moving parts subject to excessive corrosion and maintenance under practical conditions of use for fishing. As attempts to overcome these problems having been not altogether satisfactory, there is a need for a concealed-hook fishing lure that is useful in waters containing weeds and other debris, that is self setting, and having a simple mechanism for deploying the hook, and the ability to deploy hooks in multiple directions relative to the lure body.

SUMMARY OF THE INVENTION

A concealed-hook fishing lure is disclosed which maintains the hook retracted within the lure up to the moment of the strike, and at the moment of the strike, automatically extends the heretofore concealed hook upwardly into the mouth of the fish, thereby facilitating the setting of the hook in the fish's mouth, which lure is useful in waters containing weeds and other debris, and which provides improvements with respect to a simple mechanism for deploying the hook, and the ability to deploy hooks in multiple directions relative to the lure body.

A further object is to provide such a lure in which the hook may be readily retracted to and cocked in its concealed position following a strike.

A further object is to provide an improved spring-loaded, snap-open fish hook assembly which is actuated by movement of a trigger arm to cause a pair of hooks to move in opposite directions to engage both the upper and lower parts the fish's mouth.

Another object is to provide a fish hook assembly combining the features of a self-setting, weedless, concealed hook lure which is simple in operation, durable in use and economical in manufacture.

Other objects, features and objectives of the invention will be found throughout the following description, the drawings and the claims.

BRIEF DESCRIPTION OF THE DRAWINGS

For a more complete understanding of the features and advantages of the present invention, reference is now made to the detailed description of the invention along with the accompanying figures in which corresponding numerals in different figures refer to corresponding parts and in which.

DETAILED DESCRIPTION OF THE INVENTION

Figure 1:
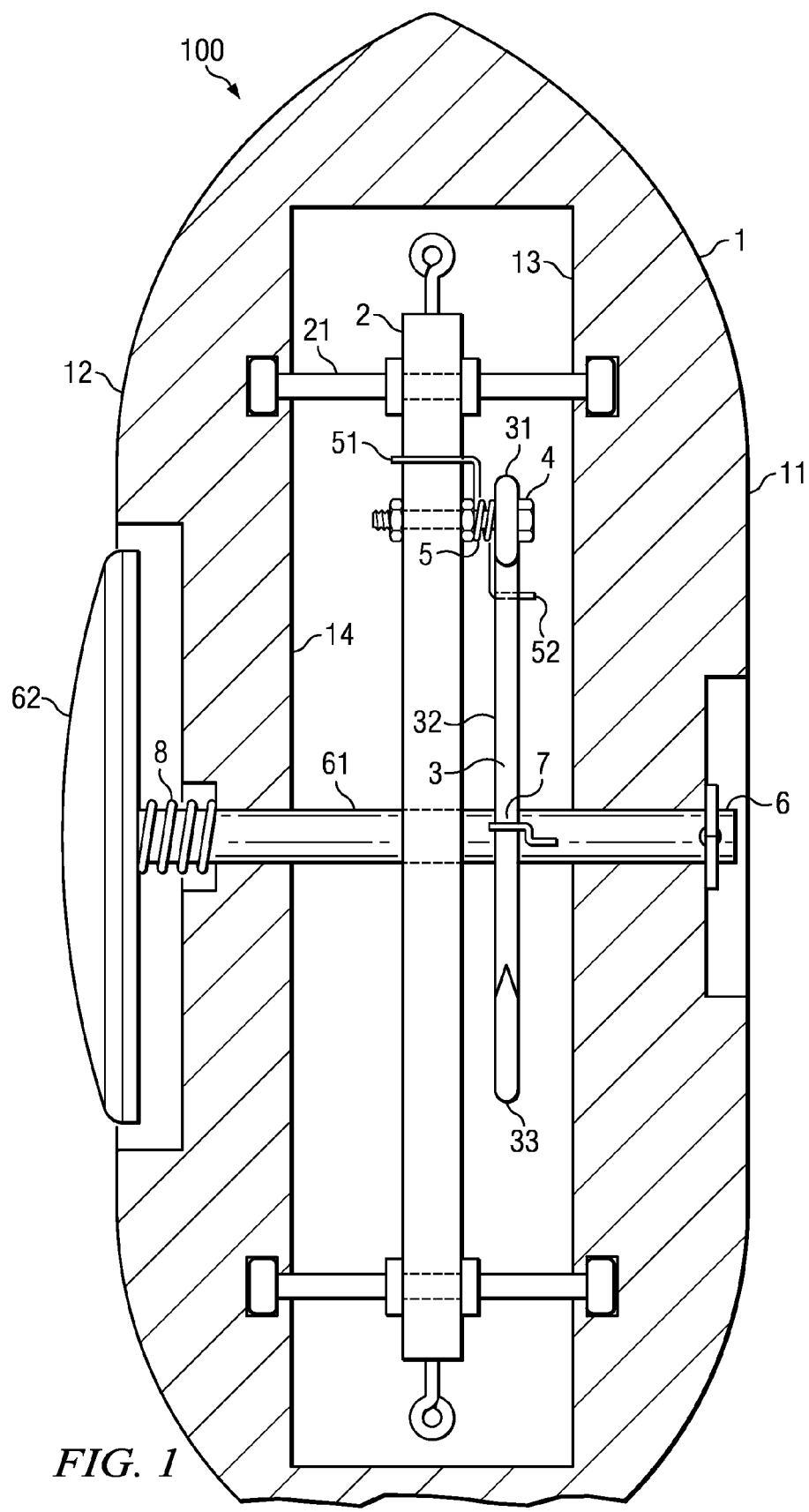
FIG. 1 is a top plan view of a fishing lure according to the preferred embodiment of the present invention, showing the hook in the concealed, non-deployed position.
Figure 2:
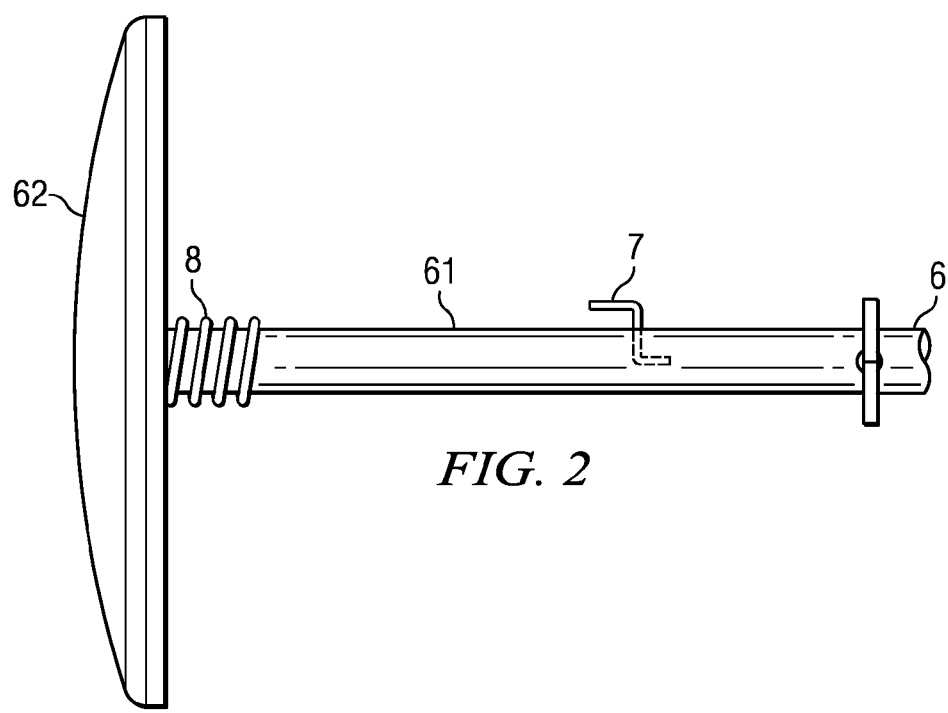
FIG. 2 is a detail of the trigger mechanism according to the preferred embodiment of the present invention.

The concealed-hook fishing lure 100 of the present invention, as shown in FIGS. 1 and 2, has a body 1 having exterior sides 11 and 12, and interior sides 13 and 14. The interior sides of the body define a interior opening or cavity having a longitudinal axis along the body between the exterior sides of the body. The cavity provides a chamber in the body where one or more fishing hooks can be concealed when in the non-deployed position.

At least one bar 2 is provided that is connected to the body 1 by means of a connecting rod 21 and is positioned between the interior sides of the body. At least one hook 3, having a connecting portion 31 a shank portion 32 and a barbed end portion 33, is pivotally mounted to the bar 2 at the hook's connecting portion 31 by any usual mounting means, such as hook mounting bolt, 4. The hook 3 is positioned relative to the bar 2 and to the body 1 such that the hook 3 may be pivotally moved from a first concealed position to a second deployed position, with the hook 3 extending outside the body 1 when in the deployed position. A coil spring 5 having a first end clip 51 and a second end clip 52 is provided on the hook mounting bolt 4, and positioned proximate to the connecting portion 31 of the hook 3, and connectedly fixed to the bar. The first end clip 51 of the coil spring 5 is secured on the bar 2, and the second end clip 52 is positioned and frictionally connected to the shank portion 32 of the hook 3. The coil spring 5 is biased to force the hook 3 into the deployed position.

Positioned laterally to and beneath the shank portion of the hook 3, a shaft 6, having a head portion 62 and a tail portion 61, is slideably connected to the body 1 along an annulus in and through the body 1 between the exterior sides 13 and 14. A shaft spring 8 is provided along the tail portion 61 of shaft 6 between one of the exterior sides and the head portion 62. To retain the hook 3 inside the body 1 in the concealed position, a trigger clip 7 is provided. The first end of the trigger clip 7 is fixed to the shaft 6; and the second end of trigger clip 7 is frictionally connected to hook 3 along the shank portion 32 of hook 3. The second end of trigger clip 7 is positioned on the shaft 6 such that the second end of trigger clip 7 will hold the hook 3 in the concealed position until external pressure, such as the strike of a fish, depresses the head portion 62 of the shaft 6. The shaft spring 8 is biased to hold the shaft such that the head portion 62 of the shaft 6 is exposed and protruding from the body 1. When the head portion 62 of the shaft 6 is depressed, the shaft 6 will move slideably through the annulus in body 1, which movement will cause the second end of trigger clip 7 to release hook 3, at which time the coil spring 5 will cause the barbed end 33 of hook 3 to pivot from the concealed position to the fully deployed position.

Figure 4:
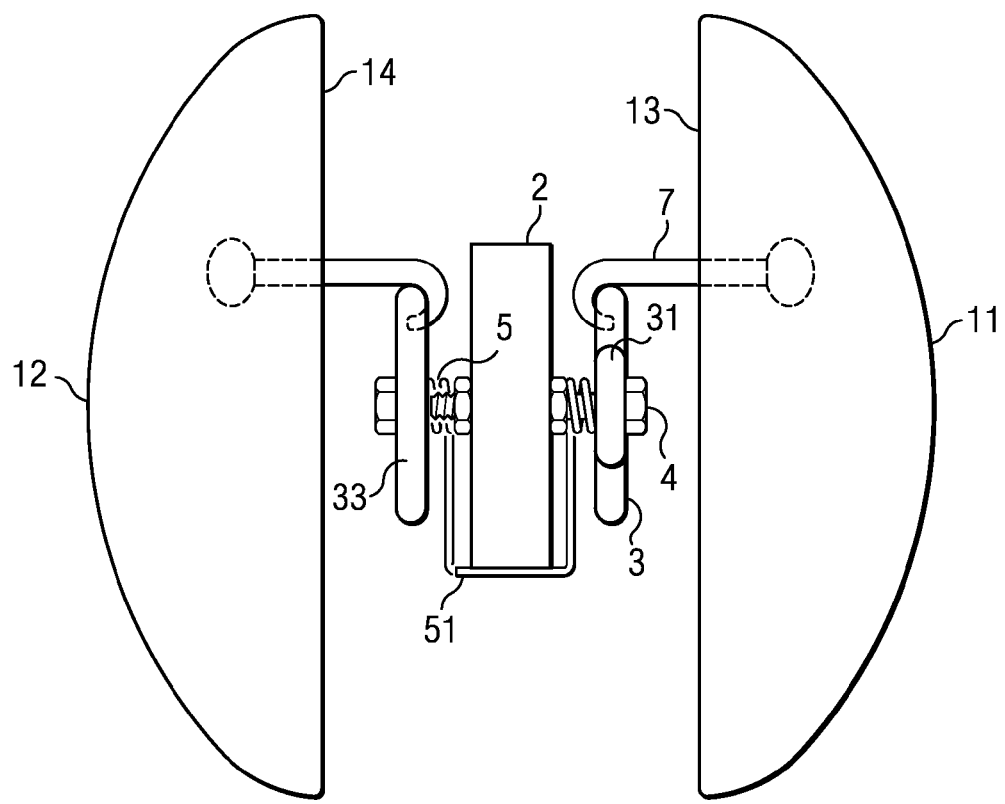
FIG. 4 is a rear elevational view of the lure of FIG. 3.
Figure 3:
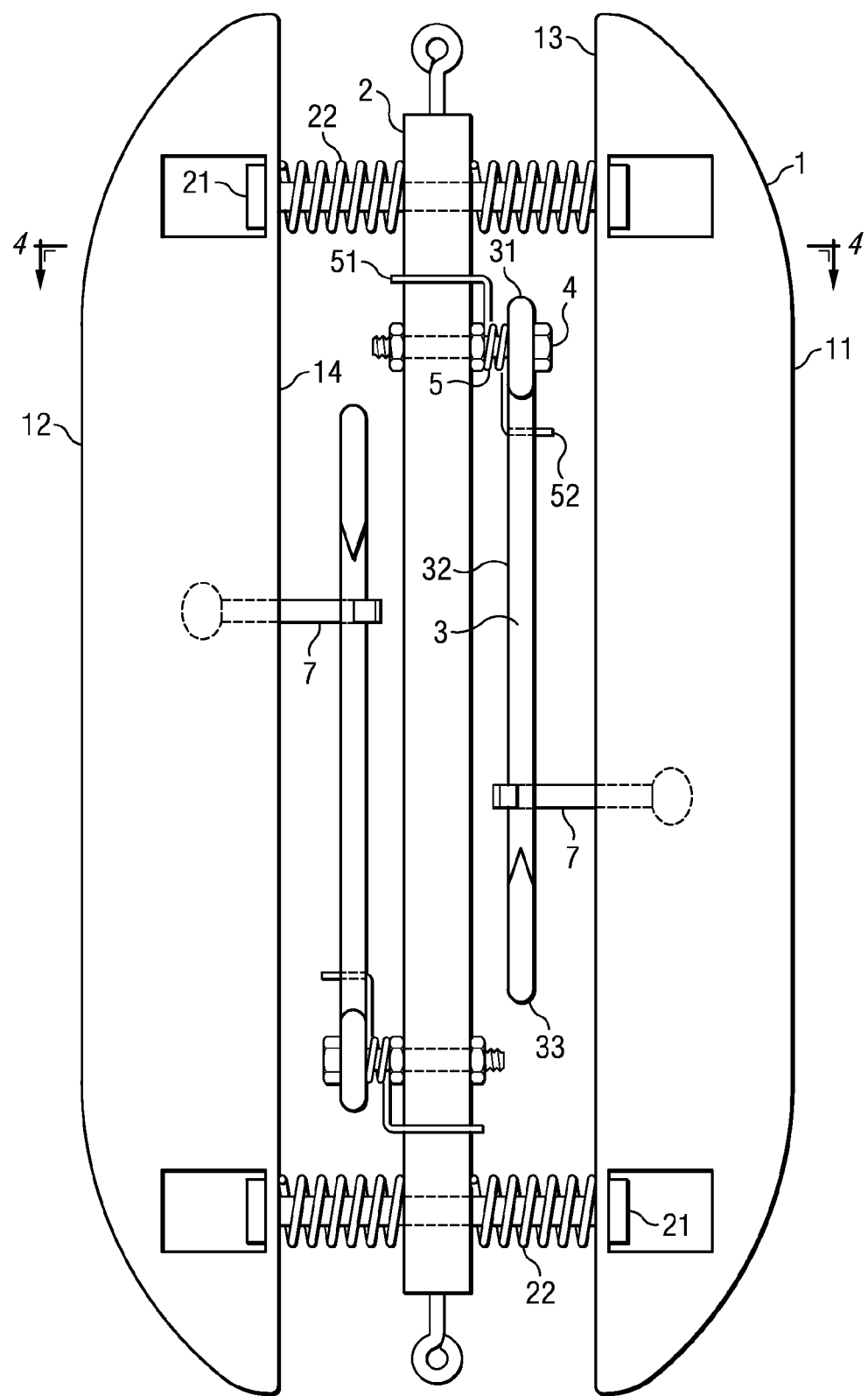
FIG. 3 is a top plan view of a fishing lure according to a first alternative embodiment of the present invention, showing the hook in the concealed, non-deployed position.

A first alternative embodiment of the present invention is shown in FIGS. 3 and 4. In the first alternative embodiment, the concealed-hook fishing lure 100 of the present invention has a body 1 having exterior sides 11 and 12, and interior sides 13 and 14. The interior sides of the body define a interior opening or cavity having a longitudinal axis along the body between the exterior sides of the body. The cavity provides a chamber in the body where one or more fishing hooks can be concealed when in the non-deployed position.

At least one bar 2 is provided that is connected to the body 1 by means of at least one connecting rod 21 which is positioned between the interior sides of the body. At least one rod spring 22 is provided along the rod 21 and positioned between the bar 2 and one of the interior sides of the body 1. The rod spring 22 is biased to hold the body 1 away from the bar 2. At least one hook 3, having a connecting portion 31 a shank portion 32 and a barbed end portion 33, is pivotally mounted to the bar 2 at the hook's connecting portion 31 by any usual mounting means, such as hook mounting bolt, 4. The hook 3 is positioned relative to the bar 2 and to the body 1 such that the hook 3 may be pivotally moved from a first concealed position to a second deployed position, with the hook 3 extending outside the body 1 when in the deployed position. A coil spring 5 having a first end clip 51 and a second end clip 52 is provided on the hook mounting bolt 4, and positioned proximate to the connecting portion 31 of the hook 3, and connectedly fixed to the bar. The first end clip 51 of the coil spring 5 is secured on the bar 2, and the second end clip 52 is positioned and frictionally connected to the shank portion 32 of the hook 3. The coil spring 5 is biased to force the hook 3 into the deployed position.

To retain the hook 3 inside the body 1 in the concealed position, a trigger clip 7 is provided. The trigger clip 7 is positioned laterally to and beneath the shank portion of the hook 3. The first end of the trigger clip 7 is fixed to one of the interior sides of the body 1; and the second end of trigger clip 7 is frictionally connected to hook 3 along the shank portion 32 of hook 3. The second end of trigger clip 7 is positioned along an interior side of body 1 such that the second end of trigger clip 7 will hold the hook 3 in the concealed position until external pressure, such as the strike of a fish, depresses the external sides of body 1. When the external sides of body 1 are depressed, the second end of trigger clip 7 will release hook 3, at which time the coil spring 5 will cause the barbed end 33 of hook 3 to pivot from the concealed position to the fully deployed position.

Figure 5:
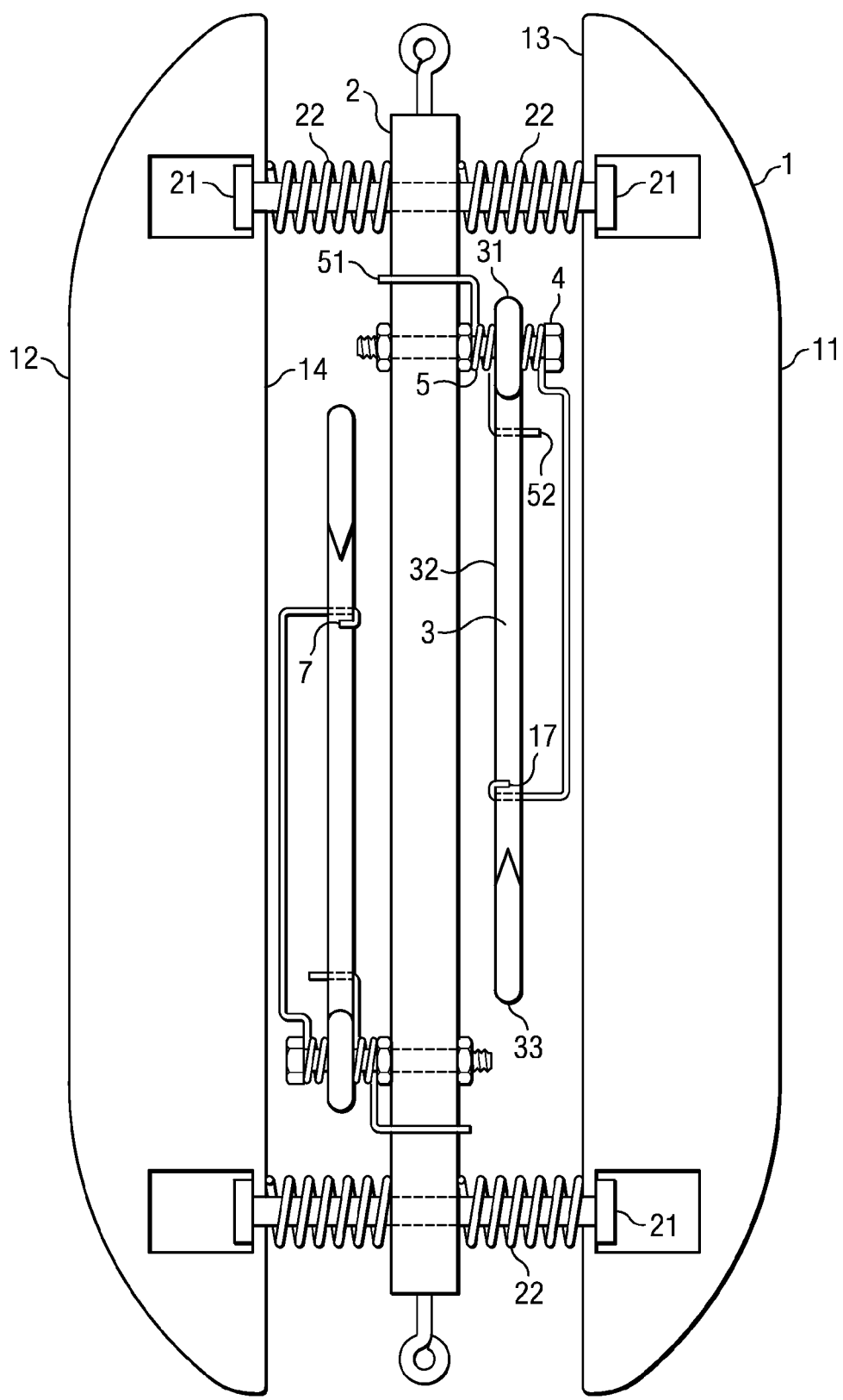
FIG. 5 is a top plan view of a fishing lure according to a second alternative embodiment of the present invention, showing the hook in the concealed, non-deployed position.

A second alternative embodiment of the present invention is shown in FIG. 5. In the second alternative embodiment, the concealed-hook fishing lure 100 of the present invention has a body 1 having exterior sides 11 and 12, and interior sides 13 and 14. The interior sides of the body define a interior opening or cavity having a longitudinal axis along the body between the exterior sides of the body. The cavity provides a chamber in the body where one or more fishing hooks can be concealed when in the non-deployed position.

At least one bar 2 is provided that is connected to the body 1 by means of at least one connecting rod 21 which is positioned between the interior sides of the body. At least one rod spring 22 is provided along the rod 21 and positioned between the bar 2 and one of the interior sides of the body 1. The rod spring 22 is biased to hold the body 1 away from the bar 2. At least one hook 3, having a connecting portion 31 a shank portion 32 and a barbed end portion 33, is pivotally mounted to the bar 2 at the hook's connecting portion 31 by any usual mounting means, such as hook mounting bolt, 4. The hook 3 is positioned relative to the bar 2 and to the body 1 such that the hook 3 may be pivotally moved from a first concealed position to a second deployed position, with the hook 3 extending outside the body 1 when in the deployed position. A coil spring 5 having a first end clip 51 and a second end clip 52 is provided on the hook mounting bolt 4, and positioned proximate to the connecting portion 31 of the hook 3, and connectedly fixed to the bar. The first end clip 51 of the coil spring 5 is secured on the bar 2, and the second end clip 52 is positioned and frictionally connected to the shank portion 32 of the hook 3. The coil spring 5 is biased to force the hook 3 into the deployed position.

To retain the hook 3 inside the body 1 in the concealed position, a trigger clip 7 is provided. The trigger clip 7 is positioned laterally to and beneath the shank portion of the hook 3. The first end of the trigger clip 7 is fixed to the hook mounting bolt 4, and the second end of trigger clip 7 is frictionally connected to hook 3 along the shank portion 32 of hook 3. The second end of trigger clip 7 is positioned along the shank portion 32 of hook 3, and trigger clip 7 is tension biased such that the second end of trigger clip 7 will hold the hook 3 in the concealed position until external pressure, such as the strike of a fish, depresses the external sides of body 1. When the external sides of body 1 are depressed, the internal side of body 1 adjacent to trigger clip 7 will depress trigger clip 7 which will release hook 3, at which time the coil spring 5 will cause the barbed end 33 of hook 3 to pivot from the concealed position to the fully deployed position.

The invention claimed is:

1. A concealed-hook fish lure comprising:
a body having first and second exterior sides and first and second interior sides, with said first and second interior sides defining an open interior space and defining a longitudinal axis between said first and second sides,
at least one bar positioned between said first and second interior sides of said body in said open interior space along said longitudinal axis,
at least one rod having first and second ends positioned generally perpendicular to said longitudinal axis, with said first end of said at least one rod and said second end of said at least one rod slideably connected to respective interior sides of the interior sides of said body, and said at least one rod connected to said at least one bar at a location between said first and second ends of said at least one rod,
a spring positioned along said at least one rod between said at least one bar and one of said interior sides of said body,
at least one hook having a connecting portion, a shank portion, and a barbed end portion, said at least one hook pivotally mounted on said at least one bar at said connecting portion of said at least one hook, said at least one hook positioned relative to said at least one bar and said body such that said at least one hook may be pivotally moved from a first concealed position to a second deployed position,
at least one coil spring positioned proximate to said connecting portion of said at least one hook, said at least one coil spring having first and second end clips, with said first end clip of said at least one coil spring fixedly connected to said at least one bar, and said second end clip of said at least one coil spring frictionally connected to said shank portion of said at least one hook, said at least one coil spring biased to throw said at least one hook from said first concealed position to said second deployed position,
at least one trigger clip having first and second ends, with said first end of said at least one trigger clip operatively connected to said at least one bar, and said second end of said at least one trigger clip frictionally connected to said shank portion of said at least one hook to form a catch for selectively holding said at least one hook in said first concealed position and selectively releasing said at least one hook.

2. The concealed-hook fish lure of claim 1 wherein said at least one trigger clip is biased to hold said at least one hook in said first concealed position.

3. The concealed-hook fish lure of claim 1 wherein said at least one trigger clip includes a spring element.

4. The concealed-hook fish lure of claim 1 wherein said at least one coil spring includes first and second coil springs and said at least one hook includes first and second hooks mounted on said at least one bar on opposite ends of said body.

5. The concealed-hook fish lure of claim 1 wherein said second end of said at least one trigger clip is in the form of a small hook frictionally engaged with said shank portion of said at least one hook.

* * * * *